March 22, 1927. 1,622,068

H. P. THOMPSON

WINDSHIELD HEATER

Filed Jan. 13, 1922

Witness:
P. F. Gathmann

Inventor:
Henry P. Thompson
Burton & Burton
his Attorneys

Patented Mar. 22, 1927.

1,622,068

UNITED STATES PATENT OFFICE.

HENRY P. THOMPSON, OF CHICAGO, ILLINOIS.

WINDSHIELD HEATER.

Application filed January 13, 1922. Serial No. 528,891.

The purpose of this invention is to provide means for heating a transparent window such as the glass windshield usually provided on an automobile, so as to prevent the accumulation of snow or ice thereon and to evaporate water therefrom, in order to keep the shield clear at all times and afford the operator an unobstructed view therethrough. I have illustrated several forms of the invention as applied to motor vehicles and particularly as used on vehicles employing an internal combustion engine. The invention consists broadly in the application of a discharge conduit for supplying heated air to the surface of a transparent window, and it includes various details and features and elements of construction hereinafter described and shown in the drawings as indicated by the claims.

Figure 1:
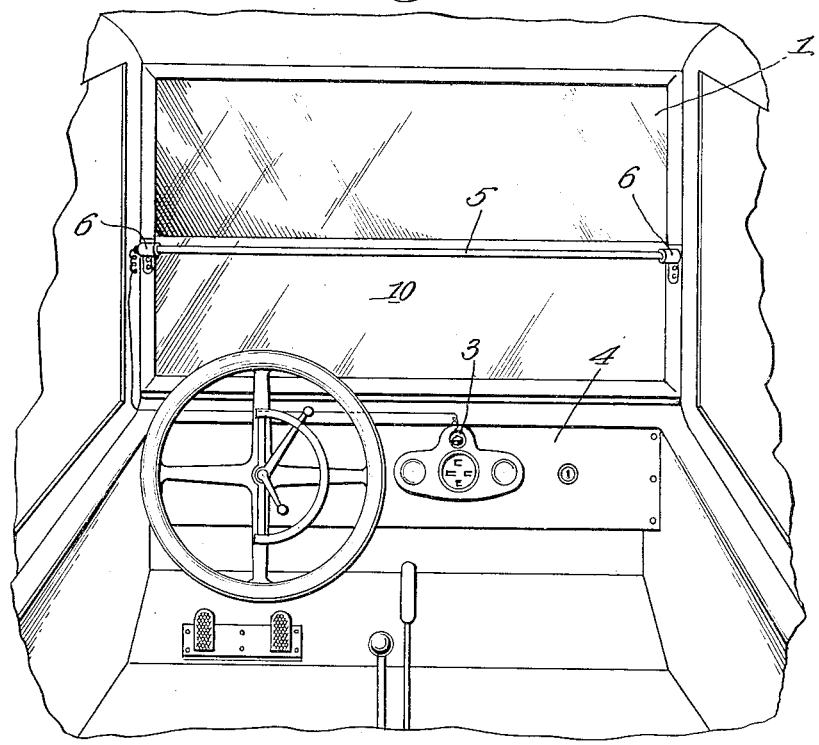
Figure 1 is an elevation of an automobile windshield being taken as a fragmentary view of the interior of the vehicle body looking forward from the driver's seat and showing a heating device embodying this invention applied to the windshield.
Figure 2:
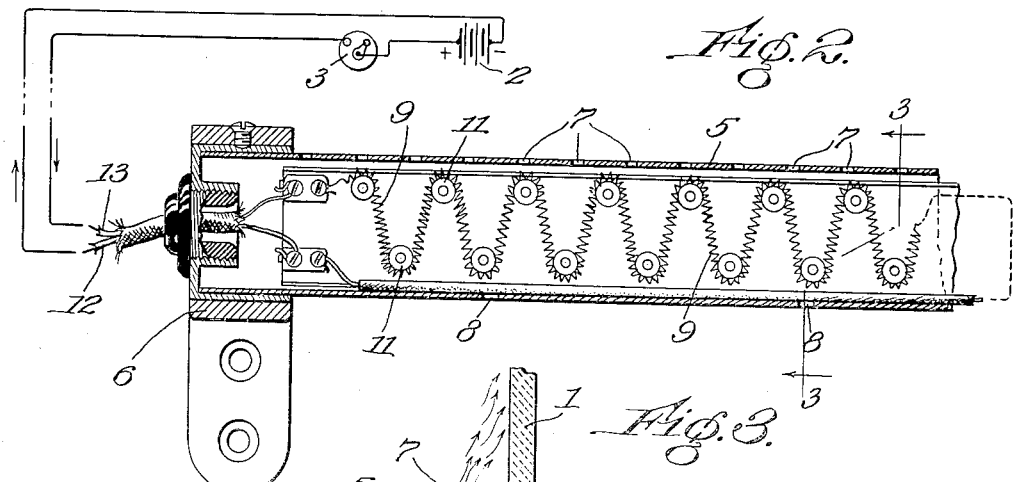
Figure 2 is an enlarged detail section of the heating device including an electrical wiring diagram therefor.
Figure 3:
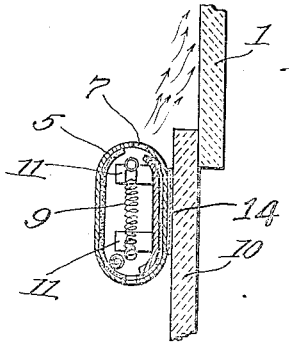
Figure 3 is a transverse section taken as indicated at line 3—3 on Figure 2.

The construction shown in Figures 1, 2 and 3 is applicable to automobiles whether driven by internal combustion engines or by storage batteries and electric motors, since the heat generated in this device for warming the windshield glass, 1, is produced simply by an electric current from any suitable source such as the battery indicated diagrammatically at 2 in Figure 2. Any suitable switch, 3, may be provided at a convenient location such as the instrument board, 4, for supplying the current to the heater or cutting it off at will. The heating device includes a tube or conduit, 5, mounted in brackets, 6, so as to extend across the front of the vehicle body and adjacent the surface of the windshield. As shown in this particular instance, the windshield consists of the upper glass, 1, and the lower glass, 10, but it will be understood that for the driver's convenience, it is more necessary to keep the upper section, 1, clear and the tube or conduit, 5, is therefore provided with discharge openings, 7, at its upper side and with air intake openings, 8, at its lower side, as shown in Figure 2. Within the tube a coil of suitable resistance wire, 9, is supported on insulators, 11, and connected at its opposite ends with the lead wires, 12 and 13, of the battery circuit, so that when the circuit is closed the heat radiated from the wire, 9, will warm the air in the tube, 5, causing it to expand and flow upwardly through the discharge openings, 7, and to be replaced by cooler air entering the openings, 8. In this way a constant flow of warm air will be produced upwardly across the surface of the windshield, 1, so that presently the glass will become so warm that snow alighting on its outer surface will be partially melted and will slip off and the moisture thus produced on the outer surface will be rapidly evaporated.

To prevent rattling of the tube, 5, against the glass, 10, I prefer to insert a thin cushion strip as shown at 14 on Figure 3. This strip may be of felt, leather or other suitable cushioning substance, but preferably such that it will offer substantially no resistance to the passage of heat through it, as I have found that in practice the conduction of heat from the tube, 5, to the lower glass section, 10, of the windshield is very effective in keeping this portion of the glass clear of sleet or snow.

It is evident that the device is not limited in its application to automobiles, but will be equally serviceable on front windows of street cars, electric trains and locomotives, in all of which it is important that the operator shall have a clear vision forward.

I claim:—

1. In a motor vehicle having a transparent windshield comprising upper and lower sections, the former being mounted for adjustment away from the latter at their junction line, an electric heater and a tubular casing enclosing it extending horizontally adjacent said junction and fixed with respect to the lower section, said casing having air inlet openings at its lower side adjacent the inner side of the windshield and discharge openings at its upper side for directing the flow of heated air over the upper section.

2. In a motor vehicle in combination with a transparent windshield comprising upper and lower sections, a heating device including a tubular casing extending horizontally and closely adjacent the lower section near its upper edge, said casing having air inlet openings and having discharge openings at its upper side for directing a flow of heated air over the upper section of the windshield and being mounted against the lower section for heating said section by conduction from the casing.

In testimony whereof, I have hereunto set my hand at Chicago, Illinois, this 11th day of January, 1922.

HENRY P. THOMPSON.